July 7, 1931. R. C. JEFFRESS 1,813,854
PLOW ATTACHMENT
Filed Oct. 21, 1929
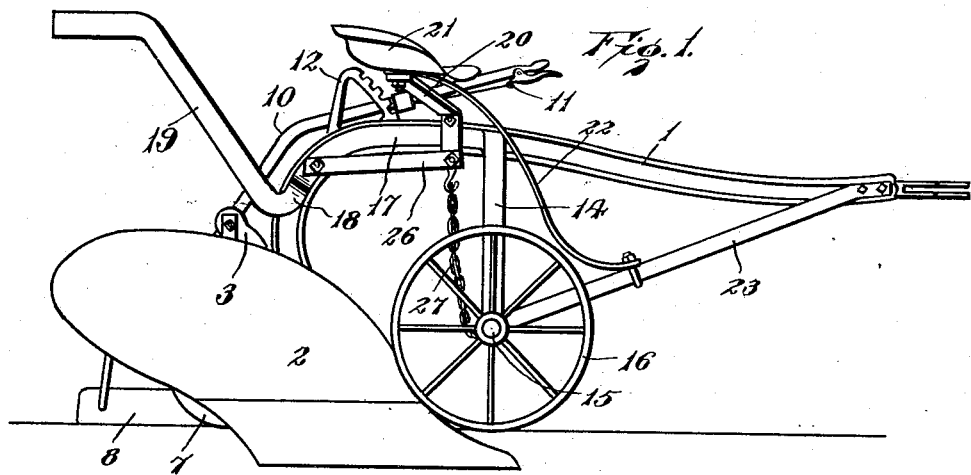
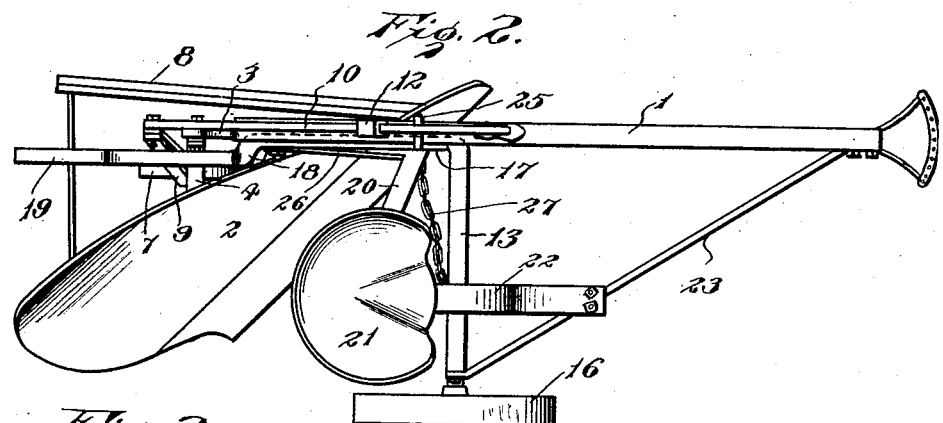
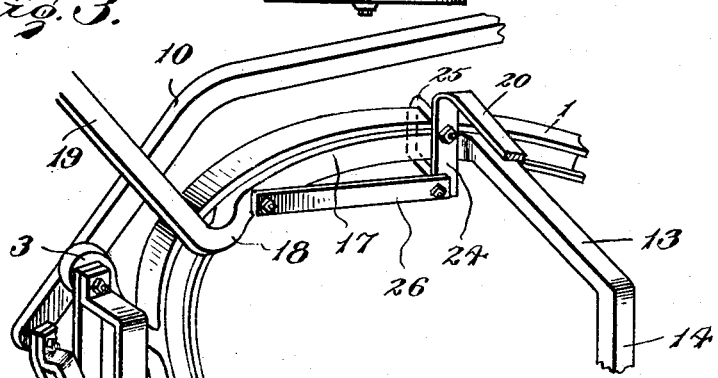
Inventor
R. C. Jeffress
By Lacey Lacey,
Attorneys Patented July 7, 1931

1,813,854

UNITED STATES PATENT OFFICE

RICHARD C. JEFFRESS, OF SKIPWITH, VIRGINIA

PLOW ATTACHMENT

Application filed October 21, 1929. Serial No. 401,228.

The object of this invention is to provide means whereby an ordinary breaking plow may be readily converted into a sulky plow. The invention has for a further object the provision of means for the stated purpose which will be simple and inexpensive and easily attached to or detached from an ordinary plow. The invention also includes means for adjusting the depth of the furrow made by the plow. The invention is illustrated in the accompanying drawings and will be hereinafter fully set forth and defined.

In the drawings:

Figure 1 is a side elevation of a breaking plow having my attachment applied thereto, Fig. 2 is a top plan view of the same, and Fig. 3 is a detail perspective view more particularly showing the means for securing the attachment to the plow.

In the drawings, the reference numeral 1 indicates a plow beam of the usual form having its rear end turned downwardly and having the plow body 2 secured thereto. In carrying out the present invention, I remove the handles ordinarily mounted upon a breaking plow, and to a projecting lug or bracket 3 at the rear of the plow beam, and to which the handles are generally secured, I attach a bracket 4 in the form of a fork or yoke having slots 5 at its lower ends, said slots receiving the pintle 6 of a roller 7 which is adapted to run in the furrow behind the share and between the moldboard and the landside, the landside being indicated at 8. The spindle 6 is, of course, vertically adjustable in the slots 5 and is mounted in the ends of a yoke 9 which is pivoted at its upper end to the rear end of a lever 10, said lever being pivoted upon the bracket 3 and extending upwardly and forwardly adjacent the beam 1 and above the beam and being equipped with a latch 11 cooperating with a holding rack or segment 12 provided upon the beam. It will be understood that by properly shifting the lever 10 the roller 7 may be set to run at a greater or less depth and, inasmuch as it is disposed between the share and the landside, it will run in the bottom of the furrow and, consequently, will govern the depth to which the plow share may penetrate the ground.

The attachment also includes an axle member or arch 13 having a vertical arm 14 at one end which carries an axle or spindle 15 at its lower extremity upon which is mounted a wheel 16. The arch 13 extends laterally from the plow beam 1 at a point in advance of the share so that the wheel 16 will be disposed to run upon the ridge of a previously formed furrow. At the end adjacent the plow beam, the arch is constructed with a rearwardly extending curved arm 17 conforming to the beam 1 and fitting within the channel of the same, as clearly shown in Figs. 1 and 3. At a point above the bracket or lug 3, the arm 17 is offset laterally, as shown at 18, whereby it will clear the flanges of the beam 1 and is then carried sharply upwardly, as shown at 19, to constitute a handle whereby the plow share may be lifted over a stone or other obstruction if such action should become necessary. A transverse supporting arm 20 is provided and extends to the right from the beam 1 to form a support for a seat 21 which is secured upon the free end of said arm. A spring 22 is secured at its rear end to the free end of the arm 20 under the seat and extends downwardly and forwardly therefrom so that its intermediate portion rests upon the arch 13 while its lower front end is firmly secured to a brace 23 which is secured to and extends between the lower end of the arm 14 and the front end of the beam, as will be understood upon reference to Figs. 1 and 2. Adjacent the beam 1, the end of the arm 20 is turned downwardly, as shown at 24, and bears against the arm 17 of the arch, a clip or U-bolt 25 being engaged around the beam and having its ends fitted through and secured in the said downturned end 24 so that the arm 20 will be firmly secured to the plow beam and will retain the arm 17 in position against the same. A brace 26 is secured to the lower end of the member 24 and has its rear end bolted to the beam and to the arm 17 adjacent the offset 18, as clearly shown in Fig. 3, so that the several members will be very firmly secured together. To further strengthen the structure and to resist possible forward swinging movement of the wheel 16 and its support, a chain 27 is secured to the lower end of the member 24 and to the spindle 15, as indicated in Fig. 1.

From the foregoing description, taken in connection with the accompanying drawings, it will be seen that I have provided a very simple means whereby the ordinary breaking plow may be quickly converted into a sulky plow so that the plowman may ride upon the plow and be relieved of the labor of walking behind the plow to direct the team and hold the plow to its work. The attachment will add very little to the dead weight of the implement and inasmuch as there is provided a wheel 16 to run upon the surface of the ground and also a furrow roller 7 to run in the furrow, the plow may be held to its path without requiring manual labor on the part of the plowman, the guiding of the draft animals being sufficient to hold the plow to the desired line. The supporting arm 20 serves to brace the spring 22 which carries the seat 21 and said spring is further braced by passing across and resting upon the top of the arch 13, the end of the arm 20 upon which the seat is mounted being free and, therefore, capable of yielding somewhat to the vibrations of the implement while at work, while at the same time it will be sufficiently rigid to brace the spring and prevent the breaking of the same.

Having thus described the invention, I claim:

1. An attachment for plows comprising an arch, a wheel carried by one side of the arch, an arm projecting rearwardly from the opposite side of the arch and conforming to a plow beam, a transverse supporting arm having a downturned end bearing against the side of the plow beam and said rearwardly projecting arm adjacent the point of contact of the transverse portion of the arch with the beam, means engaged with said downturned end of the supporting arm to clamp the same and the rearwardly projecting arm of the arch to the beam, a seat mounted upon the free end of said supporting arm, a brace connecting the wheel-carrying side of the arch with the forward portion of the plow beam, and a spring secured to the free end of said arm and extending forwardly and downwardly therefrom to rest upon the top of the arch, the lower front end of said spring being connected with said brace.

2. An attachment for breaking plows comprising a hanger bracket, means for pivotally mounting said bracket at its upper end upon the rear side of a plow beam, a lever pivoted between its ends coincidently with the bracket, a hanger pivoted at its upper end to the rear end of the lever and having its lower end disposed between and guided by the sides of the bracket, a roller carried by the lower end of said hanger to run in a furrow, and means for pivotally adjusting the lever and securing it in a set position.

3. An attachment for breaking plows comprising an integral structure including an axle member, a vertical wheel-carrying arm at one end of said axle member, a rearwardly projecting arm at the opposite end of the axle member curved to conform to a plow beam and offset at its rear end to pass around a flange on the plow beam, and an extension projecting upwardly and rearwardly from the offset end of the arm.

In testimony whereof I affix my signature.

RICHARD C. JEFFRESS. [L. S.]